United States Patent Office 3,320,427
Patented May 16, 1967

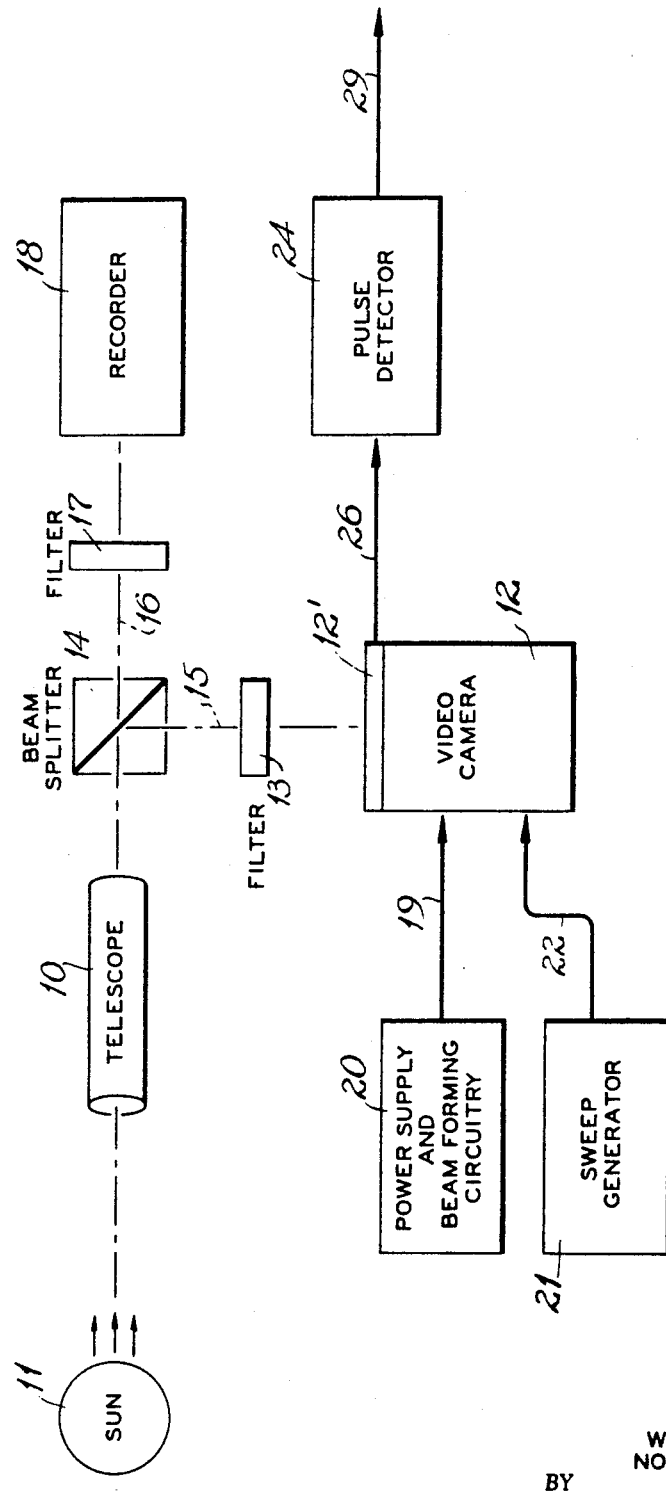

3,320,427
RADIATION MONITORING APPARATUS
William B. Evans, North Babylon, Norman M. Gutlove, Huntington Station, and John P. O'Brien, Huntington, N.Y., assignors, by mesne assignments, to Fairchild Hiller Corporation, Hagerstown, Md., a corporation of Maryland
Filed Sept. 6, 1963, Ser. No. 307,048
9 Claims. (Cl. 250—217)

The invention described herein was made in the performance of work under a NASA contract and is subject to the provisions of the National Aeronautics and Space Act of 1958, Public Law 85–568 (72 Stat. 426; 32 U.S.C. 2451), as amended.

This invention relates broadly to monitoring and detecting apparatus and more particularly to an apparatus adapted to monitor sources of radiant energy and detect irregularities in localized portions of such sources to the end that such irregularities may be instantaneously scrutinized and/or analyzed.

Among other things, the present invention contemplates localized spontaneous events in relatively large areas or bodies under surveillance and means for focusing on such events at substantially their onset whereby they may be directly observed, studied and recorded throughout their existence. Thus, means is provided herein which may be employed to rapidly detect outbursts of radiant energy occurring in relatively large areas to enable the phenomena associated therewith to be directly observed and/or recorded.

While the instant apparatus has general utility and application wherever rapid response to spontaneous events is required, it is particularly useful in astrophysical research, permitting detailed observations and analyses of heavenly bodies. Thus, data, useful in understanding the interplanetary and terrestrial affect of phenomena originating in such bodies, as well as the formation of theories concerning energy, such as its production, transfer, conversion, etc. become for the first time attainable.

By way of example, sporadic flares emanating from the sun herald a sudden outburst of solar activity that interacts with the interplanetary and terrestrial environment to an appreciable extent. Among other things, harmful radiation accompanies these flares which represent severe hazards to manned space flights as well as general ionospheric disturbances that perturb the earth's magnetic field. Thus, these flares result in geomagnetic storms and the currents induced thereby adversely affect communications.

At the same time these flares are catastrophic disturbances of short duration, usually less than an hour. It is, therefore, desirable to have these flares under observation for close examination continuously from the earliest moment or onset, to their ultimate decay.

Techniques heretofore employed to observe solar flares depend upon lengthy studies, observations and analyses of localized areas of the sun whereby information is collected, correlated and recorded in an effort to predict future areas and times of flares. At best, such practice leaves much to chance and has proven to be objectionably inefficient.

It is the purpose of the present invention to overcome the foregoing as well as other shortcomings in existing practice in the radiation monitoring art. To this end an apparatus is herein proposed that is capable of continuously observing a radiant or luminous body or target and sensing incipient disturbances in localized areas thereof so that attention can be focused on any such area at the earliest moment and direct, detail studies conducted of the event throughout the period of its existence.

More specifically, the instant device includes optical telescopic means to monitor the target continuously and direct its image onto a camera, a filter being disposed in the path of the image ahead of the camera to pass only selected radiation corresponding to and indicative of the disturbance. Each such disturbance in the visible region contains a characteristic spectrum. In the case where the sun or the like is the target it has been determined that the best visible spectral ranges in which to observe flare onset are the strong emission lines of the hydrogen alpha and sometimes the calcium II+ K and H lines. Thus, in this case the camera monitors the buildups of at least one of these lines of radiation and generates a varying pulse corresponding to point to point image magnitude and intensity.

Associated with the camera is electronic circuitry including an adjustable control means which is set to transmit selected portions of the video camera signal which correspond to image characteristics of the disturbance phenomena, e.g., a solar flare. The resultant output signal thus contains information relating to the magnitude of the particular disturbance, as well as information useful in locating such disturbance. By means of and through associated equipment this resultant output signal can be employed to focus on the precise area of interest at high magnification. Thus, narrow-angle observatory sensors may be employed to directly examine the area in detail at and during the precise period of disturbance.

With the above and other objects in view as will be apparent this invention consists in the construction, combination and arrangement of parts all as hereinafter more fully described, claimed and illustrated in the accompanying drawing, wherein is shown a schematic view of a preferred embodiment of the invention designed specifically to monitor solar flares including the control circuitry in block diagram for the adjustment and operation thereof.

More specifically, 10 designates a sighting instrument, for example, a telescope appropriately mounted in any conventional manner for movement in the several necessary planes of operation whereby it is capable of tracking a moving radiant target for example an astral body, such as the sun 11. Thus, radiation emanating from the entire area or surface of the sun 11 passes through the telescope 10 where it is properly focused onto the screen 12′ of a video camera 12. Interposed between the telescope 10 and the camera 12 is a filter 13 which is adapted to pass only selected radiation, for example the hydrogen alpha spectral band, whereby other radiation from the sun is excluded from the screen 12′ of the camera 12.

Where it is desired also to permanently record selected radiation, beam-separating means 14 may be incorporated in the system in the path of radiation between the telescope 10 and filter 13 to divide or split such radiation into separate paths, one through the filter 13 as at 15 and the other as at 16 through appropriate filter means 17 into a film recorder 18.

The video camera 12 is connected by conductor means 19 to a suitable power source and beam-forming circuitry 20 in order to energize it. The camera 12 embodies means for generating an output signal in response to the image upon its screen. To this end the circuitry 20 includes means to create an electron beam and focus it on the camera screen 12′. Also associated with the camera 12 is a generator 21 electrically connected thereto through a conductor 22 whereby the electron beam thus produced is made to sweep or scan the screen in the conventional manner whereby a video signal is generated in response to the image.

On the output side of the camera 12 is an adjustable control circuit to transmit only those portions of the video signals which correspond to image size and intensity characteristic of the phenomena under investigation. This control includes an electronic gate that functions as a pulse discriminator and its adjustment capabilities allows the user to select desired image ranges for investigation.

More particularly, this control circuit comprises an adjustable pulse detector 24 which is electrically connected to the screen 12' by a conductor 26 and is sensitive to signals or pulses therefrom, being energized only by those pulses within the adjusted range of amplitude and/or width. To detect solar flares above a predetermined intensity a simple biased detector circuit is used, for example, a one-shot multivibrator which is triggered by signals from the video camera above a predetermined level. To detect solar flares of a given size the same, or a different, detector circuit is used and is provided with an integrator circuit in its input. An independent output signal is transmitted from the sensor 24 by a conductor 29 to associated equipment (not shown) which can be used for any desired purpose, e.g. positioning the telescope, alarm, etc.

From the foregoing it is apparent that the detector 24 may be adjusted to a signal value corresponding to that of predetermined level or range of radiation intensity and/or size so that in scanning the screen 12' of the camera 12, only signals of the selected value are operative on and transmitted to the associated equipment. The associated equipment may include high-powered relatively narrow field-sighting means or telescopes. A localized area of the sun may thereby be examined substantially at and during the time of a solar flare. At the same time the associated equipment may include appropriate circuitry to synchronize the operation of components thereof, such as for example the recorder 18, with the occurrence of the disturbance as indicated by the selected pulse range.

What is claimed is:

1. Apparatus for monitoring a spontaneous radiant energy emitting event occurring in a distant radiant energy emitting astrol body, the event characterized by the emission from said body of radiant energy having a characteristic wavelength comprising: telescopic means for optically monitoring said radiant energy emitting body, an electronic camera means having a screen sensitive to the radiant energy of said characteristic wavelength, filter means disposed in an optical path between said optical monitoring means and said electronic camera means for passing to said screen from the total radiant energy emitted by the body substantially only the radiant energy having said characteristic wavelength, and means connected to said camera means for forming an electrical signal corresponding to the radiant energy having the characteristic wavelength imaged on said screen.

2. Apparatus according to claim 1 further comprising means electrically connected to said signal forming means for detecting electrical signals corresponding to a predetermined intensity of radiant energy of said characteristic wavelength imaged on said screen.

3. Apparatus according to claim 1 further comprising means electrically connected to said signal forming means for detecting electrical signals corresponding to a predetermined size area of radiant energy of said characteristic wavelength emitted by said body and imaged on said screen.

4. Apparatus according to claim 1 further comprising means electrically connected to said signal forming means for detecting electrical signals corresponding to a predetermined intensity and size area of radiant energy of said characteristic wavelength emitted by said body and imaged on said screen.

5. Apparatus according to claim 1 further comprising a radiation beam splitter located in the optical path between said electronic camera means and said optical monitoring means, and film recorder means, said beam splitter producing two separate beams of monitored radiant energy, one of the beams having the radiant energy of said characteristic wavelength imaged on the screen of the electronic camera means and the other imaged on the film recorder means.

6. Apparatus according to claim 1 wherein said characteristic wavelength is the hydrogen alpha line.

7. Apparatus according to claim 1 wherein said characteristic wavelength is the calcium II$^+$ line.

8. Apparatus according to claim 1 wherein said characteristic wavelength is the K line.

9. Apparatus according to claim 1 wherein said characteristic wavelength is the H line.

References Cited by the Examiner

UNITED STATES PATENTS

| | | | |
|---|---|---|---|
| 2,674,915 | 4/1954 | Anderson | 250—219 |
| 2,892,949 | 6/1959 | Hardy | 250—203 X |
| 3,174,045 | 3/1965 | Whitney et al. | 250—226 X |
| 3,175,089 | 3/1965 | Talley et al. | 250—203 |
| 3,204,101 | 8/1965 | Brunfield et al. | 250—226 X |
| 3,215,848 | 11/1965 | Zworykin | 250—219 |

WALTER STOLWEIN, *Primary Examiner.*